(12) United States Patent
Sherman

(10) Patent No.: US 11,437,719 B2
(45) Date of Patent: Sep. 6, 2022

(54) DIGITAL ARRAY SIGNAL PROCESSING METHOD FOR AN ARRAY RECEIVER

(71) Applicant: BAE Systems Information and Electronic System Integration Inc., Nashua, NH (US)

(72) Inventor: Matthew J. Sherman, Succasunna, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 404 days.

(21) Appl. No.: 16/697,715

(22) Filed: Nov. 27, 2019

(65) Prior Publication Data

US 2021/0159595 A1 May 27, 2021

(51) Int. Cl.
*H01Q 21/29* (2006.01)
*H01Q 3/26* (2006.01)
*H01Q 1/36* (2006.01)

(52) U.S. Cl.
CPC ............. *H01Q 3/2682* (2013.01); *H01Q 1/36* (2013.01); *H01Q 21/29* (2013.01)

(58) Field of Classification Search
CPC ............................ H01Q 3/2682; H01Q 21/29
USPC ....................................................... 342/372
See application file for complete search history.

(56) References Cited

U.S. PATENT DOCUMENTS

| | | |
|---|---|---|
| 2003/0022627 A1 | 1/2003 | Fernandez-Corbaton et al. |
| 2006/0246863 A1 | 11/2006 | Reed |
| 2008/0153501 A1* | 6/2008 | Harris .................. H04B 7/0408 455/562.1 |
| 2012/0044917 A1 | 2/2012 | O'Keeffe |
| 2014/0340260 A1* | 11/2014 | Richards .................. H01Q 3/34 342/377 |
| 2016/0381596 A1 | 12/2016 | Hu et al. |

FOREIGN PATENT DOCUMENTS

| | | | | |
|---|---|---|---|---|
| CN | 1992956 A | * | 7/2007 | |
| EP | 1207630 A2 | * | 5/2002 | ........... H04B 7/0617 |
| WO | WO-2011042045 A1 | * | 4/2011 | ........... H04B 7/0408 |

OTHER PUBLICATIONS

International Search Report, PCT/US20/62032, dated Feb. 9, 2021, 11 pages.

* cited by examiner

*Primary Examiner* — Harry K Liu
(74) *Attorney, Agent, or Firm* — Sand, Sebolt & Wernow LPA; Gary McFaline

(57) ABSTRACT

A digital or smart array antenna has at least one radio and a processor coupled to each antenna element. The processor is coupled with programmable logic that demodulates a plurality of signals received at one antenna element to obtain demodulation symbols. After obtaining the demodulation symbols, the programmable logic applies a weighting function. In this order or sequence, the digital array antenna is able to reduce the processing requirements associating within the signal information. The reduced processing requirements enable the signal information to be shared with adjacent antenna elements that may be timing adjusted between adjacent elements. Then, the sharing continues across all elements the array until the signal reaches an edge of the array. At the edge of the array, a signal beam may be generated that is steer in response to the processed signal information shared between all the elements in the array.

13 Claims, 5 Drawing Sheets

DIGITAL ARRAY SIGNAL PROCESSING METHOD FOR AN ARRAY RECEIVER

TECHNICAL FIELD

The present disclosure relates generally to digital array antennas. More particularly, the present disclosure relates to an improved processing technique to overcome computer-centric problems and difficulties associated with digital array antennas to enable the antenna to operate as an all directions receiver.

BACKGROUND

Currently, there are analog phased array antennas and digital phased array antennas. Typically, analog phased array antennas are more common due to their cost, whereas digital phased arrays are more expensive. In digital arrays, there is a radio element on every antenna element in the digital phased array. Each of the radios connected to a respective element in a digital phased array is connected with a system on a chip (SoC) that combines the signals from each respective independent radio element.

Smart antennas, or cognitive radio antennas, are sophisticated digital array antennas that enable the ability for each respective antenna element in the digital phased array to be independently controlled. A smart antenna, formed from a digital phased array, can be segregated into different segments or chunks. Each segregated unit is to perform a specific and different function. Example, one segment may be a radar; another segment may be a communication system. These smart digital phased array antennas can configure themselves to service the needs of multiple electronic devices. For example, the smart antenna may dynamically morph itself in order to service the needs of a communications system, a jammer, and a radar. In some cases the antenna elements can be simultaneously shared between different functions usually on receive. The SoC may be shared between multiple antenna elements. The SoC ordinarily includes a processor and a field programmable gate array (FPGA) fabric.

SUMMARY

Issues continue to exist with the processing requirements of signal information in digital array antennas. Namely, having a radio at each element in the digital array antenna generates a significant amount of information. The size of all the information creates a computer centric problem of how to process all this information in a fast manner. The present disclosure addresses these issues by utilizing the digital array antenna in a new and improved way to solve the computer centric problem of reducing the size of the signal information so that the array may operate in a more efficient manner.

In one aspect, an exemplary embodiment of the present disclosure may provide an antenna method comprising: receiving a plurality of signals from a plurality of different directions in a digital array antenna, wherein each antenna element in the digital array includes at least one radio and a processor coupled to each antenna element, and wherein the antenna elements have exchanged timing to determine a direction and time of arrival of the plurality of signals at each antenna element; processing a first signal of the plurality of signals at a first antenna element to create a first processed signal including timing information; providing the first processed signal to a second antenna element; processing the first signal at a second antenna element, based on a time adjustment accounting for the timing information of the first processed signal, to create a second processed signal; continuing to process the first signal at additional antenna elements based on time adjustments that account for the timing information, to create an ultimate processed signal; and generating an antenna beam based on the ultimate processed signal to receive a signal of interest from a source while simultaneously receiving signals from the plurality of different directions during a single time period. This exemplary method or another exemplary embodiment may further provide wherein processing the first signal at the first antenna element comprises: demodulating first signal to obtain at least one symbol; and weighting the first signal, wherein weighting the first signal occurs after demodulating the first signal to obtain the at least one symbol. This exemplary method or another exemplary embodiment may further provide demodulating the first signal at every antenna element prior to weighting the first signal. This exemplary method or another exemplary embodiment may further provide decreasing an information rate of the first signal prior to weighting the first signal. This exemplary method or another exemplary embodiment may further provide dispreading and decoding the first signal while demodulating the first signal prior to weighting the first signal. This exemplary method or another exemplary embodiment may further provide obtaining symbols for each antenna element at a lower rate in response to demodulation than full bandwidth; combining the symbols and then weighting the first signal to provide the first signal with directionality. This exemplary method or another exemplary embodiment may further provide processing the first signal via the at least one radio and processor at one antenna element. This exemplary method or another exemplary embodiment may further provide sharing the first processed signal with at least one radio and processor connected to the second antenna element. This exemplary method or another exemplary embodiment may further provide time adjusting the first processed signal via the at least one radio and processor connected to the second antenna element. This exemplary method or another exemplary embodiment may further provide combining the first processed signal with the second processed signal via a central processing unit coupled to the first antenna element and the second element. This exemplary method or another exemplary embodiment may further provide processing signals, via a combining function in a central processing unit, from every direction at the single time. This exemplary method or another exemplary embodiment may further provide generating beams, simultaneously, based on a reduced data size of the signals processed and combined in the central processing unit. This exemplary method or another exemplary embodiment may further provide wherein the beams are generated from common data link (CDL) waveforms. This exemplary method or another exemplary embodiment may further provide wherein the CDL waveforms are bandwidth-efficient (BE) CDL waveforms. This exemplary method or another exemplary embodiment may further provide averaging the time of arrival for the plurality of signals received at the first antenna element; and transmitting processing parameters including timing delay and weight to adjacent antenna elements, wherein the transmitted processing parameter are utilized by the adjacent antenna elements to improve performance.

In yet another aspect, an exemplary embodiment of the present disclosure may provide a digital or smart array antenna has at least one radio and a processor coupled to each antenna element. The processor is coupled with programmable logic that demodulates a plurality of signals received at one antenna element to obtain demodulation symbols. After obtaining the demodulation symbols, the programmable logic applies a weighting function. In this order or sequence, the digital array antenna is able to reduce the processing requirements associating within the signal information. The reduced processing requirements enable the signal information to be shared with adjacent antenna elements that may be timing adjusted between adjacent elements. Then, the sharing continues across all elements the array until the signal reaches an edge of the array. At the edge of the array, a signal beam may be generated that is steer in response to the processed signal information shared between all the elements in the array.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

DETAILED DESCRIPTION

FIG. 1-FIG. 4 depict a centralized, digital switch beam system, or smart antenna, generally at 10. Antenna 10 includes a plurality of antenna elements 12 arranged in an array. The number of antenna elements 12 in the array may be configured to meet application specific needs of each implementation, however, it is envisioned that the array of antenna elements 12 may be an 8-element array, a 16-element array, a 32-element array, a 64-element array, or a 128-element array. While the array is ordinarily symmetrical, non-uniform arrays and array of other geometries (e.g. circular) should be possible depending on application specific needs of the user.

In accordance with one aspect of the present disclosure, antenna 10 may be a conventional smart antenna that is implemented with programmable logic to operate as an all-directions array receiver without modifying existing hardware in the antenna 10. In the antenna 10, each antenna element generally has radio 14 that may be a radio frequency integrated circuit (RFIC) 16 that includes no digital circuitry and/or a radio frequency system on a chip (SOC) 18 having digital circuitry.

Figure 1:
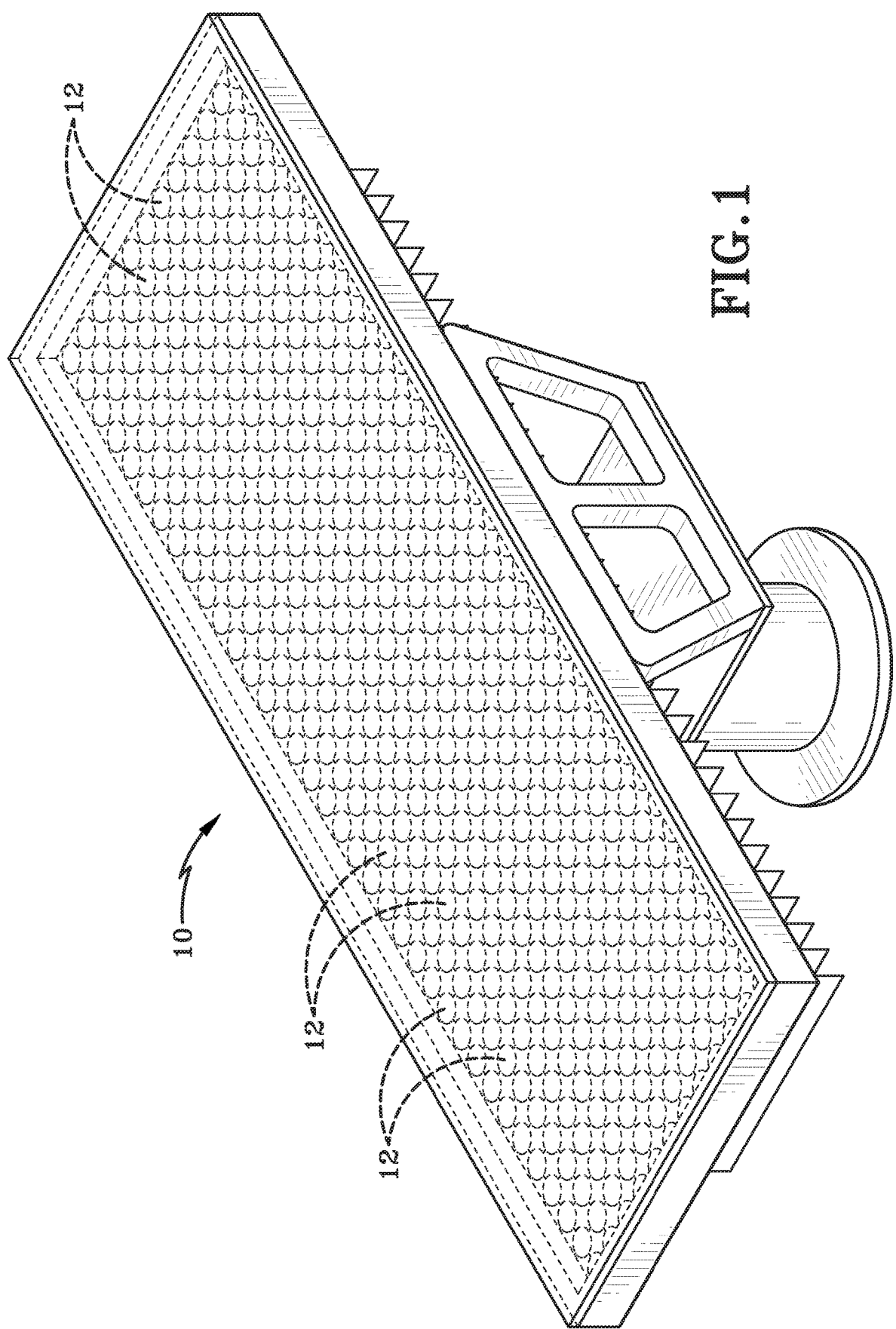
FIG. 1 is a view of an exemplary digital array antenna.
Figure 2:
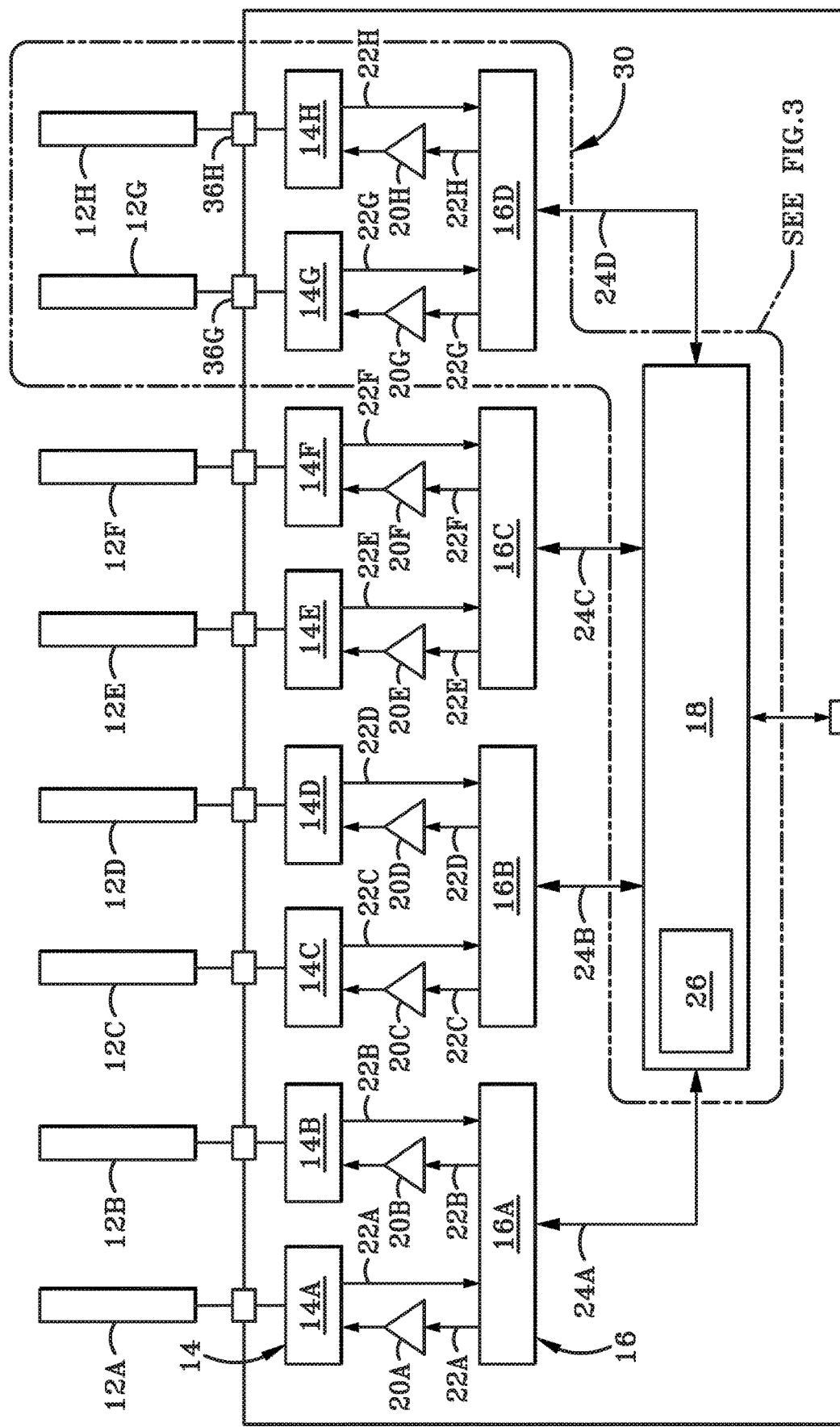
FIG. 2 is a schematic view of an exemplary centralized digital switch beam system of the digital antenna in accordance with one aspect of the present disclosure.

FIG. 2 diagrammatically depicts an exemplary row of antenna elements 12 within an array of antenna 10. More particularly, FIG. 2 depicts a first antenna element 12A, a second antenna element 12B, a third antenna element 12C, a fourth antenna element 12D, a fifth antenna element 12E, a sixth antenna element 12F, a seventh antenna element 12G, and an eighth antenna element 12H. Each antenna element is directly coupled with at least one transceiver or radio 14A-14H, respectively. For the transmit portion of each respective radio 14A-14G, there may be a power amplifier 20A-20H, respectively, that is coupled directly with the radio 14A-14H. In one particular embodiment, for every two antenna elements, there may be an RFIC 16. Thus, a first RFIC 16A may be coupled with first radio 14A and second radio 14B through links 22A, 22B, respectively. A second RFIC 16B is coupled with the third radio 14C of the third antenna element 12C via links 22C. The second RFIC 16B is coupled with the fourth radio 14D of the fourth antenna element 12D via links 22D. A third RFIC 16C is coupled with the fifth radio 14E of the fifth antenna element 12E via links 22E. The third RFIC 16C is coupled with the sixth radio 14F of the sixth antenna element 12F via links 22F. A fourth RFIC 16D is coupled with the seventh radio 14G of the seventh antenna element 12G via links 22G. The fourth RFIC 16D is coupled with the eighth radio 14H of the eighth antenna element 12H via links 22H. Each of the RFICs, 16A-16D, is coupled with the SOC 18 via links 24A-24D, respectively. The SOC 18 includes an integrated processor 26 configured to combine digital information output from the respective RFIC's 16A-16D such that the single SOC 18 interfaces the eight antenna elements 12A-12G to a single output 28.

Figure 3:
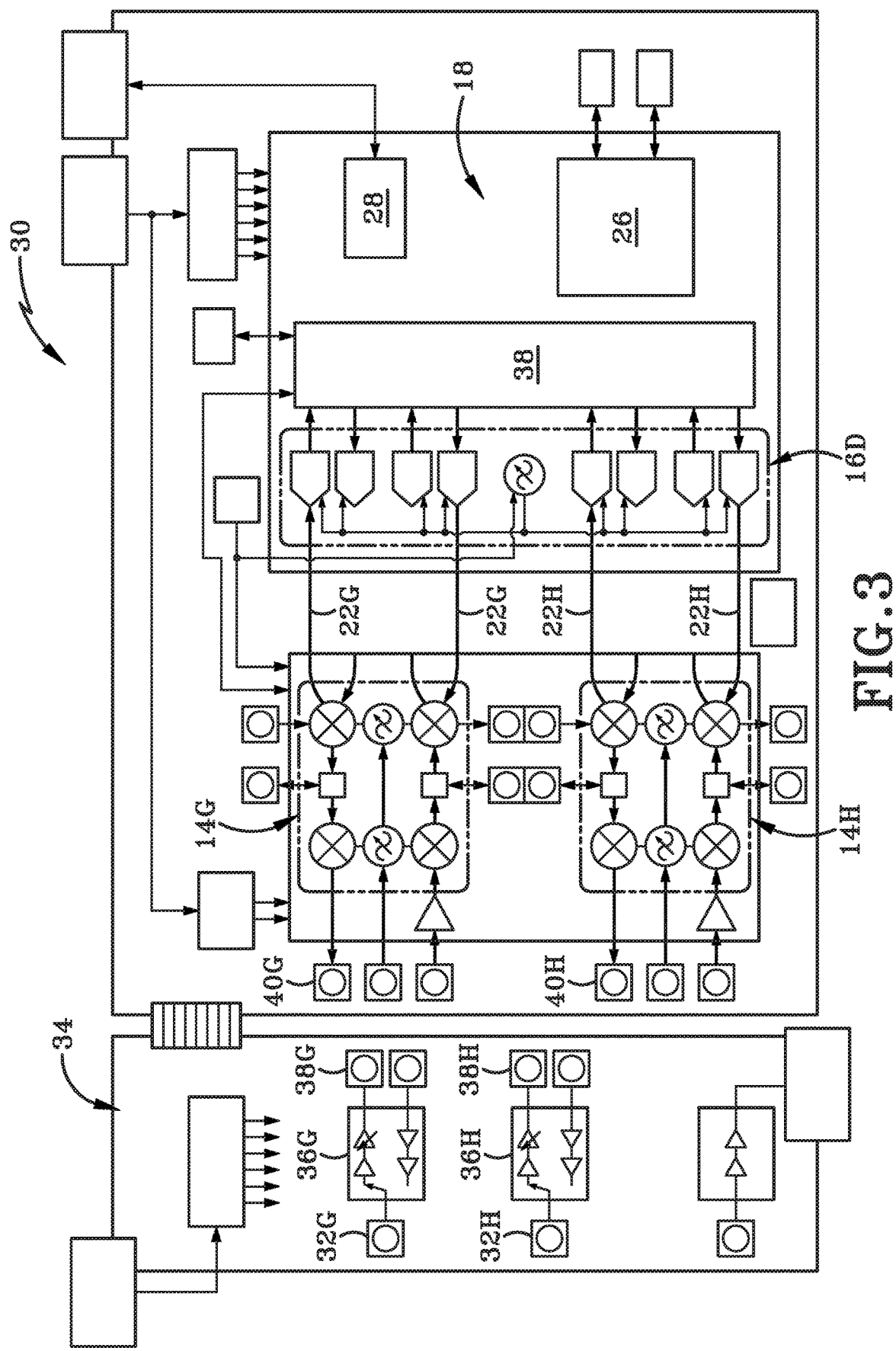
FIG. 3 is an exemplary schematic view of an antenna element signal processor.

FIG. 3 is a schematic of an exemplary antenna element signal processor (AESP) 30 of the region labeled "see FIG. 3" in FIG. 2. The exemplary AESP 30 includes two inputs 32G and 32H which receive signals from the antenna elements 12G, 12H, respectively. The inputs 32G, 32H are supported by a personality card 34, which is also referred to as the RF front end. The inputs 32G, 32H are coupled with amplifying circuitry 36G, 36H, respectively, that are connected via outputs 38G, 38H to connectors 40G, 40H on the SOC 18. The links 22G, 22H couple the fourth RFIC 16D to the respective radios 14G, 14H that are physically supported by the SOC 18. The SOC 18 may include programmable logic 38 that is configured to perform the operations of the AESP 30. As will be described in greater detail below, the programmable logic 30 may be configured to alter the conventional operation of the AESP 30. Namely, programmable logic 30 includes instructions to receive signals from a plurality of different antenna elements 16 that are receiving the signals from different directions at a single time. The programmable logic 38 further includes instructions to demodulate the signals from each of the antenna elements, which in this case would be antenna elements 12G and 12H, to obtain a demodulation symbol for each respective channel. The demodulation, or obtaining the demodulation symbol, occurs before any weighting function is applied to the symbols. This operation is described in greater detail herein, and is contrary to conventional usage of an AESP 30, which ordinarily weights each signal function prior to demodulation.

Figure 4:
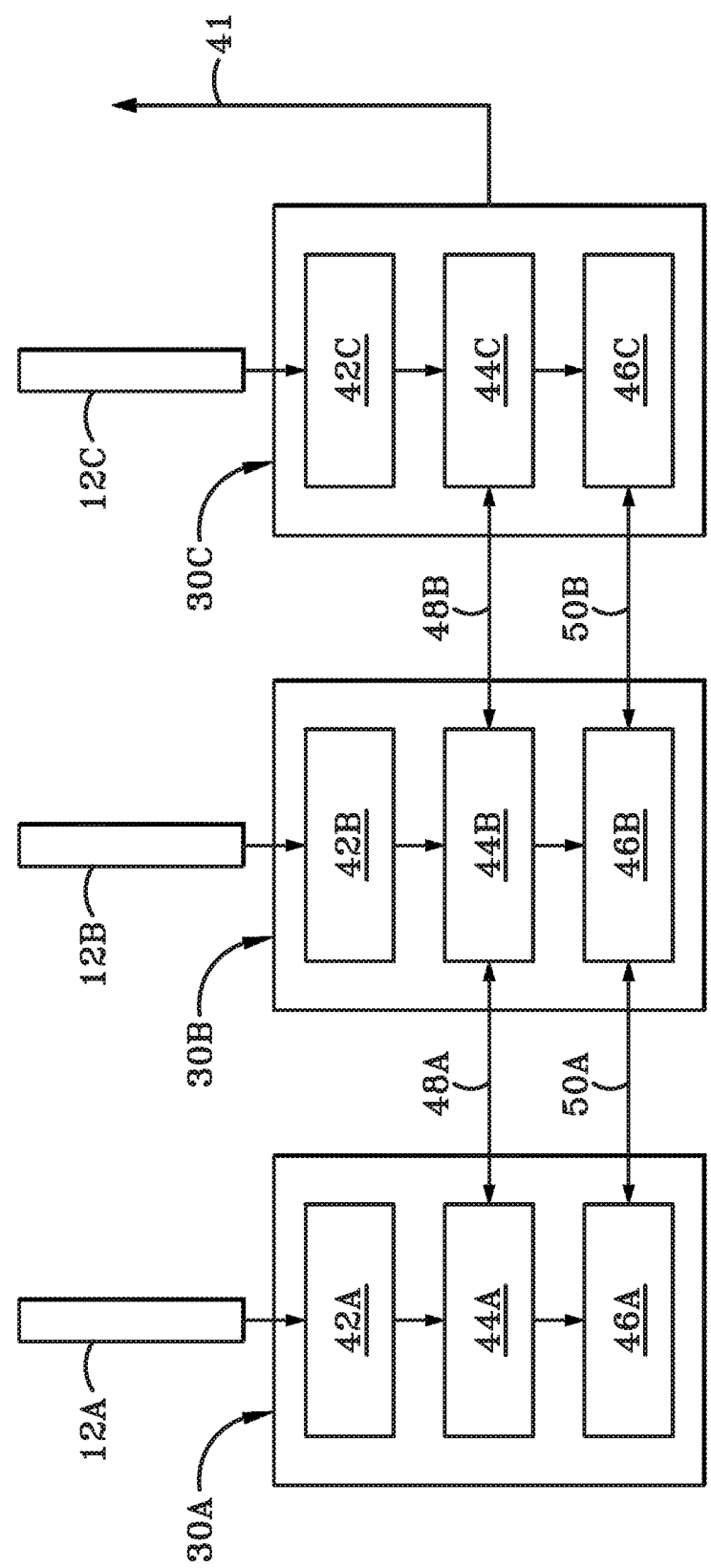
FIG. 4 is a schematic flow chart of processing performed by the antenna element signal processor.

FIG. 4 is an exemplary schematic representation of the method of operation of generating a signal beam 41 through the use of a plurality of AESPs 30. Namely, in this particular exemplary method, there may be a first AESP 30A, a second AESP 30B and a third AESP 30C. Each AESP may include a down converter and analog to digital converter 42A-42C, respectively. The down converter and ADC 42A-42B are each respectively parts of the radio 14 via the RFIC 16 or the RFSOC 18. Each AESP 30A-30B may include a sync/symbol correlator 44A-44C, respectively. The correlators are part of the programmable logic 38 on each respective AESP 30. Each AESP 30A-30C may additional include symbol storage and retiming 46A-46C, respectively.

With continued reference to FIG. 4, the signal detections, which include timing estimates or timing information of the signal, are detected by the respective antenna elements 12A, 12B, and 12C. The converter 42A converts the signal detections, as is common in a radio 14, and the programmable logic 38 demodulates the signal detections to obtain a sample stream or demodulated symbol. The correlator 44A then correlates and syncs the sample stream or demodulated symbols. The demodulation symbol is shared across a link 48A between adjacent antenna elements and adjacent AESPs. Namely, demodulation symbols from the first correlator 44A would be shared with the correlator 44B. Similarly, the demodulation symbols from the correlator 44B would be shared across link 48B with correlator 44C of the third AESP 30C. Based on the shared data between each of the AESPs 30A-30C, the symbol storage and retiming function or device would time correct the signal based on the shared timing information between the adjacent AESPs. The symbol storage and retiming device or function 46 may time correct the symbols. Then, the time corrected symbols are shared with the adjacent AESPs. Namely, the timing corrected symbols from the first AESP 30A would be shared with the second AESP via link 50A. The timing corrected symbols of the second AESP 30B would be shared with the third AESP 30C via link 50B. Based on the timing corrected symbols, the processor 26 on each AESP 30 may then calculate the proper beam 41 formation based on the timing corrected symbols. In one particular embodiment, the signal beams 41 are only produced at the edges of the array. However, it may be possible to generate the signal beam at other locations in the ray to meet other application-specific needs of the antenna 10.

The schematic of FIG. 4 depicts certain exemplary advantages of the antenna 10. Namely, antenna 10 formed from many AESPs arranged in the manner shown in FIG. 4 may operate as an all-directions array receiver. The all-directions array receiver may have a practical application for communications applications, particularly for common data link (CDL) waveforms. As will be described in greater detail herein, the digital receiver array antenna 10 has the ability to form or receive many beams 41 at a single time. Typically, in a conventional digital smart antenna the number of beams is limited by the signal and data flow processing required. When performing discovery, it is often difficult for the system or antenna 10 to search beams in all directions to see if a signal is present. As such, even with conventional teachings of an exemplary digital smart antenna, discovery is ordinarily done sequentially and can often take a long time and requires considerable coordination. Once discovery occurs, the direction of arrive of the signal is tracked and only one beam is maintained. However, it is still necessary to process wide band data for each antenna element. By altering the function of the antenna 10, the present disclosure is able to provide an all directions array receiver antenna 10 such that beams 41 are partially formed at the antenna elements to reduce data flow constraints. As will be described in greater detail herein, rather than bringing raw samples to a central processor at the sample rate for each antenna element, only soft symbol samples for each received signal are sent to the central processor. This effectively enables all directions to be searched at once for an unknown signal. Thus, there is no sequential searching, and the coordination efforts between the nodes is reduced. In accordance with the present disclosure, once a signal is acquired, the beam can still be processed in the array antenna 10 by tracking the appropriate timing offsets at each AESP 30. This is accomplished by tracking symbol timing drift via the correlator 44 and the symbol storage and retiming device or function 46. In this manner, only soft symbol samples need to be passed to the central processor for each processed beam, which greatly reduces the overall processing load at the central processor.

In one particular example, sixteen antenna elements 16 in the array antenna 10 should suffice to perform the operations discussed herein. However, it is to be understood that the scope of the present disclosure need not be limited to this number of antenna elements and any number of antenna elements are entirely possible. The array antenna 10 may be configured such that one face of the array is positioned on each side of the platform or a vehicle carrying the array antenna 10. For example, for a platform or vehicle having a front, back, left and right side, there would be four arrays with each array having between eight and sixteen elements in the array. In the present disclosure, there could be a single radio frequency integrated circuit (RFIC) 16 and a single SoC 18 for each respective array. When the array is increased in size, such as a sixty-four element array or a one hundred twenty-eight array, the digital processing associated with this high number of elements increases exponentially. Thus, certain aspects of the present disclosure provide an increased ability to harness these arrays in an improved manner that increases and more efficiently processes information to overcome this computer centric issue. Much of the impracticality associated with digital processing comes with the number of bits per digital element that are being sent from each respective element. Typically, the bits are measured in per second intervals.

In accordance with one aspect of the present disclosure, the processing may be distributed in a useful manner that enables the array to be steered. Some aspects of the array antenna 10 may be shared between several different functions. Based on the desired function, the array antenna 10 can "look" in different directions at a single time. This allows the array antenna 10 to be broken up into different pieces to do these different functions. The array antenna 10 of the present disclosure may be architected to enable different sub arrays to perform different functions simultaneously while looking in different directions, such that the digital phased array implemented with the processing techniques of the present disclosure may be considered an all directions array.

In operation and with reference to FIG. 2-3, there is a single radio 14 per antenna element 16. Radio 14 is coupled with processor 26 that performs processing, in conjunction with logic 38, on each respective element 16 that enables the antenna 10 to greatly reduce the throughput needed to support in the infrastructure of the phased array antenna. In order to perform the same, the channel may be tuned to look at a particular band or bandwidth to be processed. Thus, at the antenna element 16, the information may be filtered down to greatly decrease the size of the data that is to be processed. With respect to reception, the processor can demodulate the signal on each respective element 16 upon receipt. Thus, the demodulation occurs at the antenna element 16. Additionally, the system of the present disclosure may include an upconverter at the RFIC 16 that enables digital information or a signal at an intermediate frequency or baseband to be upconverted into the band of choice. The upconverter may include a function identifying the complex weight that is to be used to perform the upconverting function. Thus, the present disclosure provides a proper weighting, which would ordinarily be used in an analog array, and weighs each of the individual elements at a proper weight, combines the set of elements, and then publishes the signal information onto a back plane or a fiber. Then, other elements performing similar transmissions or receptions are combined in a central processing unit.

Antenna 10 flips the weighting function with the demodulation function from a conventional digital smart phased array antenna. Particularly, the digital phased array antenna 10 of the present disclosure demodulates the signal at every antenna element 16. This decreases the information rate as opposed to requiring each antenna element to support the actual bandwidth of the signal. For spread-spectrum signals, this is significant. Thus, in accordance with one aspect of the present disclosure, the digital phased array antenna dispreads and partially decodes the signal at every single element 16 and then forms the beam 41 by taking the demodulation symbols off each element 16 at a much lower rate than the full bandwidth and combines them to perform the weighting function of the antenna to give it directionality on individual information signals.

The signal is demodulated to obtain a demodulation symbol. The symbol refers to the order in which the antenna processing operations are performed. Normally, a single beam is created from the antenna. All the elements at a full bandwidth will be combined with complex weights. Then, when combined, they form a single beam. Then, the beam is demodulated to obtain modulation symbols. The present disclosure alters conventional teachings by demodulating signals at each individual antenna element. This performs more demodulation functions than previous antenna processing calculations. The demodulation is accomplished and performed by the radio 14 that is coupled to each antenna element 16. Demodulation at the element 16 obtains the demodulation symbol and it will include noise. Inasmuch as the element 16 will not be very directional, because it will be looking at all directions at once, the demodulation may effectively be processed with linear operations. The present disclosure then takes the demodulation symbols from all the elements 16 and applies the weights that would normally be applied before demodulation. This results in a beam 41 that is pointed or directed in a proper direction for a demodulated symbol. Thus, the present disclosure flips the order of operations through the use of physical hardware incorporated into the antenna 10. Essentially, the demodulation function is performed prior to the weighting function through the use of the individual radio 14 coupled each antenna element 16. The processing of the present disclosure is novel over the conventional techniques because the signal processing is normally analog. The present disclosure provides a structure with signal processing power and capabilities at the antenna element level. Previous antennas did not have these capabilities.

In operation and with reference to FIG. 3, the AESP 30 includes the processor 26 that may be a FPGA. The FPGA of processor 26 may be one of a plurality of processors. In one particular embodiment, the plurality of processors may include seven arm cores.

The FPGA (i.e., processor 26) has associated programmable logic 38. Programmable logic 38 may be configured to accomplish a desired function. To implement the weights of the adapted antenna 10, the SoC further includes digital to analog converters and analog to digital converters that allow the FPGA to connect with at least one antenna element 16. Each antenna element 16 has a transmit and a receive channel. Thus, the FPGA would be used to attach with four antenna elements that share the processors and share the programmable logic. A dedicated slice of the programmable logic could be associated with each one of the antenna elements. Effectively, there would be a separate radio for each antenna element.

The AESP 30 further includes the RFIC 16 coupled with the FPGA. The RFIC 16 enables the FPGA to sample up to two gigahertz each. Thus, it can sample up to one Gigahertz (GHz) of bandwidth at ten bytes for four elements. Thus, it can generate four Giga-samples times ten (40 gigabytes of data) a second. For each AESP 30, they may be collectively coupled with a central processor unit or main processor (not shown). If there are sixteen AESPs, each generating 40 gigabytes of data, then very quickly the data could be on the order of terabytes. The RFIC chip is able to tune up to 40 GHz. The RFIC 16 may tune from 1 GHz to 40 GHz then, a 1 GHz band may be selected to be processed.

In operation, the programmable logic 38 on the FPGA weights the individual antenna elements to form the beam 41 after demodulation of the signal. Thus, if there are four antenna elements 16, then the logic 38 will put a complex weight on each. Then, they will be combined. However, when an array is larger than these four antenna elements, such as a 64 element antenna array or a 128 element array, then these may be combined in the central processor with other programmable logics coupled to other antenna elements in the larger array. To accomplish this, the radios are combined with other data from other AESPs 30 via a digital bus. Then, the system may have eight or sixteen other radios identical to the AESP of FIG. 3 that are also producing digital data (which may be up to ten gigabits per second). There will be another processor taking the 160 GB of data, which is already partially processed based on the four elements that have been combined down to one channel on each of the cards, and all of the channels coming off of all of the cards are combined to form a particular beam that is of interest. The system of the present disclosure may actually form many beams depending on how the processing system is distributed. An exemplary feature of the present disclosure is accomplished by the programmable logic, which weighting the four antennas by the programmable logic and adding them together.

By demodulating the signals for each of the antennas in the programmable logic, a significant amount more of processing may be accomplished by performing the demodulation first and then weighting the modulation symbols. Thus, the AESP of the present disclosure is not trying to process the entire spectrum that they can currently process.

The present disclosure adds some additional features to a CDL waveform, one of which is a low probability of detection (LPD) signal, which is a spread spectrum signal. This may be accomplished by the AESP 30. In this embodiment, the beam forming is not accomplished by the AESP 30, but rather the demodulation of the signals occurs on the AESP 30. This results in symbols from each of the antennas, which is at a very low rate, but it is spread spectrum. When the dispreading is performed, there is only about 1 megabyte (MB) per element of information. Then, the lower signal size (about 10 MB) is sent to a common processor that can be processed at a much faster rate due to its smaller size. This allows many beams 41 to be formed to look in many different directions, all at the same time. Because the bandwidths are much lower, it does not need to operate as nearly a high of rate. Thus, the all directions concept of the present disclosure is based on the ability to process many beams looking in many directions all at the same time.

The system of the present disclosure enables directional networking to be accomplished. In doing discovery with directional networking, it is desirable to look in all directions at a single time. When looking in all directions, the platform carrying the antenna elements is vulnerable because it does not know whether there is an enemy or hostile platform in that direction. Once a friendly node is found, then information is only transmitted to that friendly node and the odds of a hostile or enemy node being at that location is very low. But, when the friendly node location is unknown, the entire sky must be scanned. In this instance, special signals must be used, because if a hostile or enemy node observes the discovery signal, the signal must be encoded so the hostile node cannot decode the signal to know the platform's location. Thus, low probability of detection signals are utilized. The low probability of detection signals are spread spectrum. Once a link is formed for directional networking, most of the time, the signals should not be spread spectrum. Rather, they should be high data rate and solely connecting with friendly nodes. The CDL system may incorporate low probability of detection signal. Now, the system may look in all directions, on the receive side.

In operation and with FIG. 3, a signal is input to the AESP 30 through the RF ports, which are connected to an antenna element. The personality card 34 has outputs that are coupled with inputs on the RFIC 16. Within the RFIC 16, signal is down-converted to a frequency that the SoC may understand. The output from the RFIC is input to one of the analog to digital converters on the SoC. From the analog to digital converter, the signal is sent to the programmable logic where it would normally be weighted and filtered, then is transmitted out from the serializer/deserializer (SERDES) to be combined at a central signal processor with other output information from other SERDES from other AESP.

In accordance with the present disclosure, there will be some spread spectrum signals that needs to be despread at some rate. For example, the signal may be spread by a factor of 1,000. When spread spectrum processing is performed, ordinarily processing gain is expected. Thus, for every information bit, a thousand different bits are transmitted to spread it over the spectrum. This may result in approximately 30 dB of spreading gain. There is 1 GHz of spectrum that is being used, but the system may only transmit about 1 Mb/s of data, which is sufficient for discovery. Then, there is a correlator 44 in the programmable logic 38 that is one thousand bits long. Because exact phasing of the signal is not known, there may need to be slight oversampling by a factor of two or four. Thus, instead of 2 MBs per second, it may be advantageous to sample 4 MBs per second to ensure that the system is obtaining the proper signal. Then, assuming that each is 10 bits, which results in 40 MB per signal, that is trying to be demodulated. The timing of the signal is considered to determine whether the demodulation could be performed by the FPGA. When initially looking for the wave form, it is typically not known the exact timing. Each of the 40 MB signals sent to the signal processing card, which would normally be central signal processor, for performing the final weighting. The central signal processor will combine these signals in multiple ways in order to look at many different beams at once.

Then, the central signal processor will perform the final peak detection. Through the use of a time domain correlator, the system correlates the time domain, based on the known spreading sequence, obtains a notification or indication of a signal match when the spreading sequence matches the signal. If the spreading sequence does not match the signal, then no indication would be present. When graphed, the output of the correlator will be a very low value when there is no match and there will be a spike in the line graph to indicate a match between the signal and the known spreading sequence. This represents a match that the known signal has been found. Then, this signal and signals from adjacent correlations can be observed to determine the timing accuracy. In the event that the timing is slightly off, the calculation may be utilized to determine the proper timing of the signal. Then, the center of the symbol may be determined based on how far off the timing is from the indicated signal match with the known sequence. Timing information may then be fed back to the antenna so the antenna can adjust its sampling times and sampling size so that it does not need to perform an oversampling and can simply perform a one-to-one timing sample for the correlator. Then, this results in a despread signal that can be combined in order to form a directional beam to determine whether there is another node that the antenna should connect.

In operation, an example is described for the operation of combining many beams 41 at a single time. The AESP determines peaks in each of these signals. If a matching beam with a peak is found, then the AESP may determine to only look at that beam with a high peak signal to look for a message or data to continue processing and stop processing the other beams that did not result in a signal peak indication or match. The other non-matched beams could still be monitored in the event that another node provides another signal at a later time. This provides an exemplary advantage of the AESP in that it is able to monitor and receive multiple messages at a single time. Then, once the beam that has been located with the signal determines the location of the other node, the dispreading of the signal may cease and high data transfer may be established between the antenna elements and the node. At this point, the AESP shifts from the discovery mode to a closed link high data rate mode to establish high data rate transfers between the receiving antenna and the transmitting node.

In operation and with FIG. 4, assuming an antenna has 25 dB of gain and the signal has 30 dB of spreading. Even when not forming a beam, the signal should be able to be detected since it has more dB gain. With the knowledge of the proper spreading code which should result in a peak. As such, this schematic of FIG. 4 indicates that it may be possible to detect the signal at the antenna element. The time of arrival of the signal may be estimated based on when the peak arrives. Then, the time of arrival may be passed to the adjacent antenna elements. The adjacent antenna elements will also determine a peak and at a specific time. Then, the adjacent elements will be able to track when their peak occurred relative to the time at which the other peaks occurred from the other adjacent elements. This should result in a fairly constant skew in the vertical and horizontal orientations. Thus, every time the signal moves to an adjacent element, it should be the same amount of time later or earlier when the signal arrives. Once this timing is detected, all the beam forming for that signal may be accomplished in the antenna elements themselves. By passing the timing to the adjacent elements, it may be determined who received the symbol first. Based on the timing offset, the adjacent antenna elements may offset their signal by the appropriate amount of time to align the symbols/samples and add it to the other adjacent elements. For example, for a row of adjacent elements 16, it is determined that the leftmost antenna element 16A receives the signal first. Then, this signal may be passed to the antenna element 16B to locate it immediate to its right in the row. This antenna element to the right of the leftmost antenna will know how far off in time its peaks were so it may delay and add signals so that it is in phase exactly with the leftmost antenna element. Then, the summed signals will be passed to the right, next-most antenna element 16C. This process will continue until it goes to the edge of the array. It will then determine whether to move laterally to an adjacent element in a column of the rightmost antenna element. Then as the signal gets to the end of the array, it will be at 1 MB per second. This is a significant reduction in processing power/rate required because previous conventional techniques required terabytes per second of processing power. This has been reduced down to the megabit level of processing. Thus, the advantage is reducing the processing requirements from a terabyte per second down to a few megabits per second additionally with the reduced processing power since what is provided is the exact signal that is needed. Additionally, all of the beam forming was accomplished autonomously without the need for searching.

Figure 5:
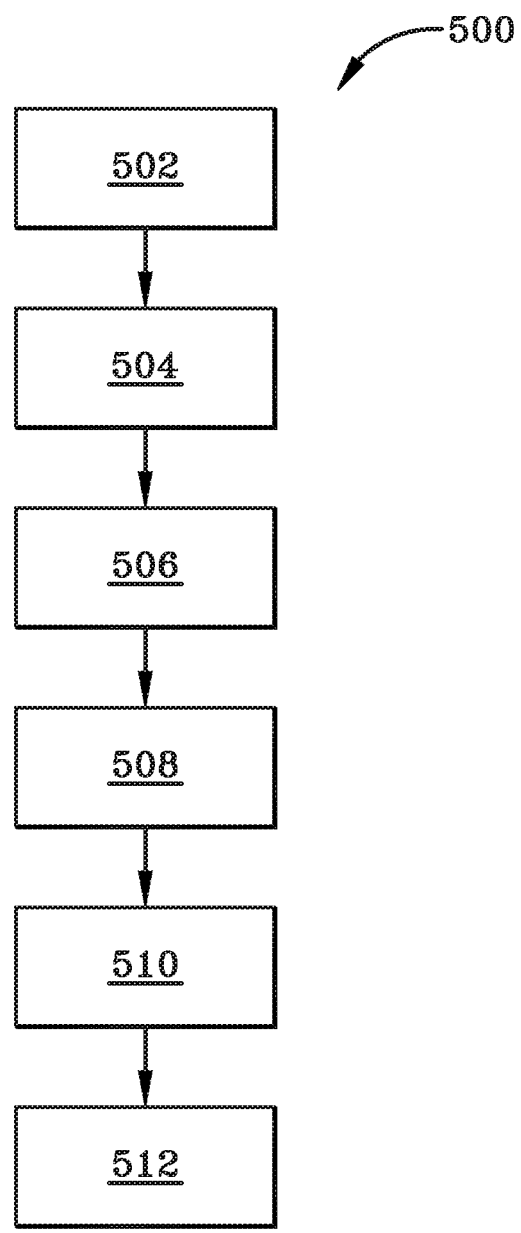
FIG. 5 is a flow chart in accordance with an exemplary method of the present disclosure.

FIG. 5 depicts an exemplary method for the antenna 10 generally at 500. Method 500 may include receiving a plurality of signals from a plurality of different directions at a single time at a digital array antenna, wherein each antenna element in the digital array includes at least one radio and a processor coupled to each antenna element, which is shown generally at 502. Method 500 may include processing a first signal of the plurality of signals at a first antenna element to create a first processed signal including timing information, which is shown generally at 504. Method 500 may include providing the first processed signal to a second antenna element, which is shown generally at 506. Method 500 may include processing the first signal at a second antenna element, based on a time adjustment accounting for the timing information of the first processed signal, to create a second processed signal, which is shown generally at 508. Method 500 may include continuing to process the first signal at additional antenna elements based on time adjustments that account for the timing information, to create an ultimate processed signal, which is shown generally at 510. Method 500 may also include generating an antenna beam based on the ultimate processed signal to receive a signal of interest from a source while simultaneously receiving signals the plurality of different directions at a single time, which is shown generally at 512.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clarity, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. An antenna method comprising:
receiving a plurality of signals from a plurality of different directions in a digital array antenna, wherein each antenna element in the digital array includes at least one radio and a processor coupled to each antenna element, and wherein the antenna elements exchange timing information to determine a direction and time of arrival of at least some of the plurality of signals at each antenna element;
processing a first signal of the plurality of signals at a first antenna element to create a first processed signal including the timing information, wherein said processing of the first signal at the first antenna element comprises:
demodulating first signal to obtain at least one symbol;
weighting the first signal, wherein weighting the first signal occurs after demodulating the first signal to obtain the at least one symbol; and
despreading and decoding the first signal while demodulating the first signal prior to weighting the first signal;
providing the first processed signal to a second antenna element;
processing the first signal at the second antenna element, based on a time adjustment to account for the timing information of the first processed signal at the first antenna element, to create a second processed signal;
continuing to process the first signal at additional antenna elements based on the time adjustments that account for the timing information, to create an ultimate processed signal; and
generating an antenna beam based on the ultimate processed signal to receive a signal of interest from a source while simultaneously receiving signals within the plurality of signals at the plurality of different directions during a single time period.

2. The method of claim 1, further comprising:
demodulating the first signal at every antenna element prior to weighting the first signal.

3. The method of claim 1, further comprising:
decreasing an information rate of the first signal prior to weighting the first signal.

4. The method of claim 1, further comprising:
obtaining symbols for each antenna element at a lower rate in response to demodulation than full bandwidth;
combining the symbols and then weighting the first signal to provide the first signal with directionality.

5. The method of claim 1, further comprising:
processing the first signal via the at least one radio and processor at one antenna element.

6. The method of claim 5, further comprising:
sharing the first processed signal with at least one radio and processor connected to the second antenna element.

7. The method of claim 6, further comprising:
time adjusting the first processed signal via the at least one radio and processor connected to the second antenna element.

8. The method of claim 1, further comprising:
combining the first processed signal with the second processed signal via a central processing unit coupled to the first antenna element and the second element.

9. The method of claim 1, further comprising:
processing signals, via a combining function in a central processing unit, from every direction at the single time.

10. The method of claim 1, further comprising:
generating beams, simultaneously, based on a reduced data size of the signals processed and combined in the central processing unit.

11. The method of claim 10, wherein the beams are generated from common data link (CDL) waveforms and the CDL waveforms are bandwidth-efficient (BE) CDL waveforms.

12. The method of claim 1, further comprising:
averaging the time of arrival for the plurality of signals received at the first antenna element; and
transmitting processing parameters including timing delay and weight to adjacent antenna elements, wherein the transmitted processing parameter are utilized by the adjacent antenna elements to improve performance.

13. A computer program product including one or more non-transitory machine-readable mediums encoded with instructions that when executed by one or more processors cause a process to be carried out for antenna signal processing, the process comprising:

receiving a plurality of signals from a plurality of different directions in a digital array antenna, wherein at least one antenna element in the digital array includes a radio and a processor coupled to at least one antenna element, and wherein the antenna element exchanges timing information with other antenna elements to determine a direction and time of arrival of at least some of the plurality of signals at each antenna element;

processing a first signal of the plurality of signals at a first antenna element to create a first processed signal including the timing information for the first antenna element;

providing the first processed signal to a second antenna element;

creating a second processed signal from the first signal at the second antenna element, further comprising a time adjustment for the timing information for the first element;

continuing to process the first signal at one or more additional antenna elements based on additional time adjustments that account for the timing information for the first antenna element, and creating an ultimate processed signal; and generating an antenna beam based on the ultimate processed signal to receive a signal of interest from a source while simultaneously receiving signals at the plurality of different directions during a single time period; and wherein the beams are generated from common data link (CDL) waveforms.

* * * * *